INVENTORS
Masamitsu Kawakami
BY Masayoshi Mochimaru
Wenderoth & Wenderoth

INVENTORS
MASAMITSU KAWAKAMI
MASAYOSHI MOCHIMARU
BY
Mestern & Mestern

INVENTOR.
Masamitsu Kawakami
Masayoshi Mochimaru
BY
Wenderoth & Mertens

INVENTOR.
Masamitsu Kawakami
Masayoshi Mochimaru
BY
Wenderoth & Western

United States Patent Office 3,355,645

Patented Nov. 28, 1967

3,355,645

CONSTANT SPEED ELECTRIC MOTORS INCLUDING A VIBRATING MAGNETIC DRIVE

Masamitsu Kawakami, Setagaya-ku, Tokyo-to, and Masayoshi Mochimaru, Kita-ku, Tokyo-to, Japan, assignors to Hisao Maeda and Masamitsu Kawakami, both of Tokyo-to, Japan Filed July 16, 1964, Ser. No. 383,017
Claims priority, application Japan, July 18, 1963, 38/38,832
3 Claims. (Cl. 318—138)

ABSTRACT OF THE DISCLOSURE

A constant speed motor whose rotor has a plurality of bar magnets, equally spaced, and a stator which consists of a vibrating member carrying a magnet on its free end. The rotor is caused to rotate at constant speed by the influence of the attractive and repulsive forces between the several magnets.

This invention relates to novel constant speed electric motors which can be used to drive electric clocks and many other rotating loads.

It is a general object of this invention to provide novel constant speed electric motors which are simple to fabricate and light in weight and have small size.

In one form of this invention, the constant speed motor comprises a rotor in the form of a circular disc or an annular ring and a stator in the form of a vibrating member which is fixed at one end and supports a magnet on the free end to face the inner or outer periphery of said rotor. A plurality of bar magnets are secured on the inner or outer periphery of the rotor at equal spacings, said bar magnets being magnetized in the radial direction of the rotor to provide alternating poles of opposite polarities. The magnet of the vibrating member may be magnetized in the radial or circumferential direction of the rotor. Suitable means, such as an electromagnet, is provided to vibrate the magnet on the vibrating member in the axial or circumferential direction of the rotor so as to cause rotation thereof at a constant speed by the attractive and repulsive forces created between the magnets on the rotor and the magnet on the vibrating member. The rotational speed of the motor is determined by the member of pole pairs of the magnets on the rotor and the frequency of oscillation of the vibrating member.

In another form of this invention, the bar magnets of the rotor are magnetized in the axial direction thereof so as to have poles of opposite polarities at their opposite ends and each pair of adjacent bar magnets are so magnetized that their corresponding ends have different polarities. The bar magnets may be parallel to or inclined with respect to the axis of the rotor.

While the specification concludes with claims particularly pointing out and distinctly claiming the subject matter which we regard as our invention, it is believed that the invention will be better understood from the following description taken in connection with the accompanying drawings in which like parts are designated by like reference characters, and in which:

Figure 7:
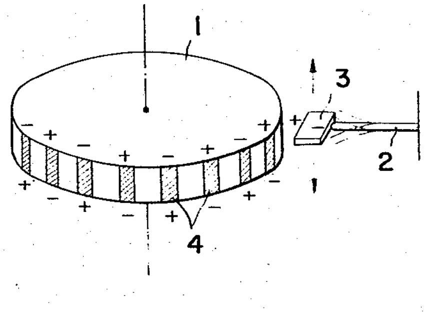
Figure 6A:
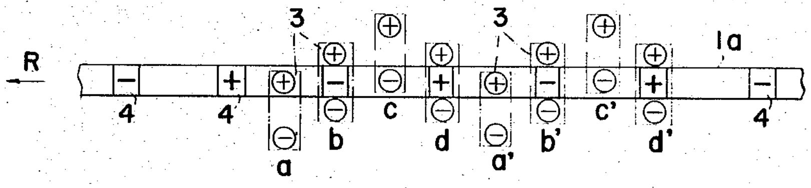
Figure 6B:
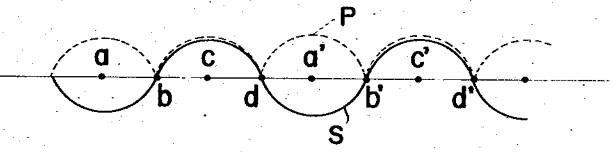
Figure 8:
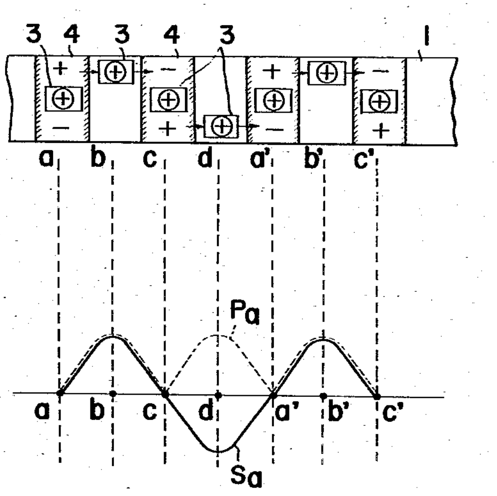
Figure 9:
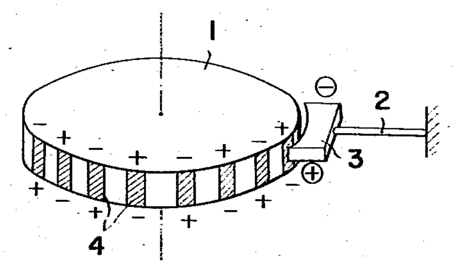
Figure 10:
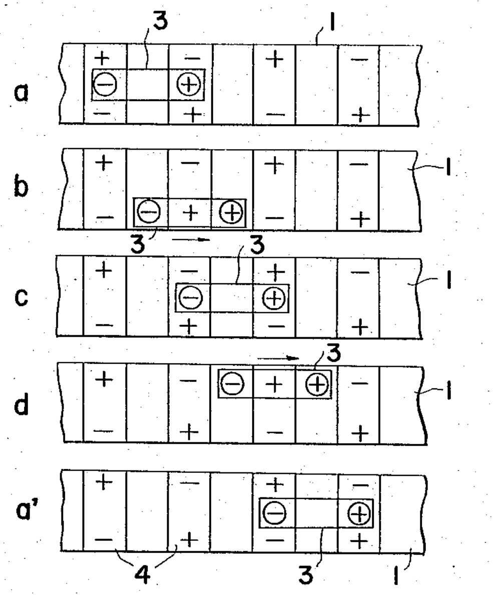
Figure 11:
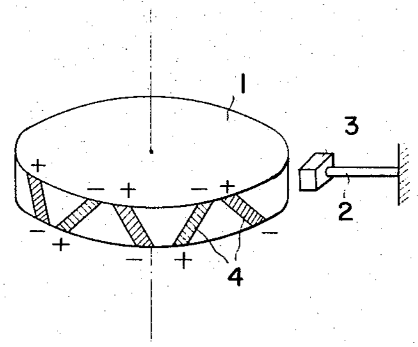
Figure 12:
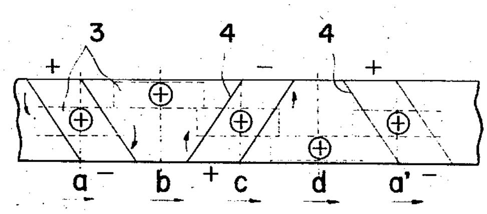
Figure 13:
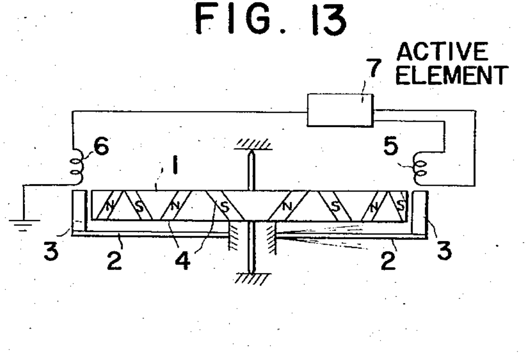

FIGS. 6(A) and 6(B) are diagrams to explain the principle of this invention;

FIG. 7 is a perspection view of another form of this invention;

FIG. 8 is a diagram to explain the operation of the motor shown in FIG. 7;

FIG. 9 is a perspective view of a modification of the motor shown in FIG. 7;

FIG. 10 is a diagram to explain the operation of the motor shown in FIG. 9;

FIG. 11 is a perspective view of another modification of the motor shown in FIG. 7;

FIG. 12 is a diagram to explain the operation of the motor shown in FIG. 11; and FIG. 13 is a schematic view of still another example of the present invention in which the rotor magnets are secured at equal space intervals around the periphery of the rotor in such a manner that N poles and S poles are alternately disposed with alternately opposite inclinations.

Throughout the drawings reference numeral 1 represents a rotor, 2 a stationary vibrating member, and 3 a magnet mounted upon the free end of the vibrating member.

In the embodiments shown in FIGS. 1, 3, 4 and 5 a plurality of bar magnets 4 are disposed with equal spacings around the periphery of a rotor 1. These magnets are magnetized in the radial direction to provide alternate poles of the opposite polarities around the periphery of the rotor 1. These poles can be provided by magnetizing spaced sections of the periphery or embedding bar magnets around the periphery at equal intervals.

Figure 1:
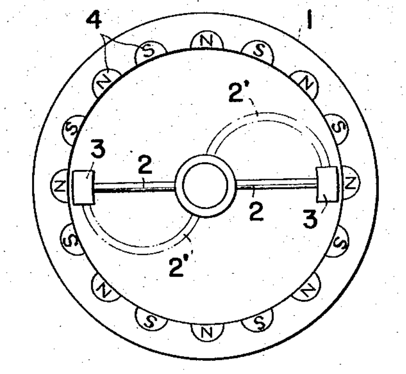
FIG. 1 is a plan view of one embodiment of this invention.
Figure 2:
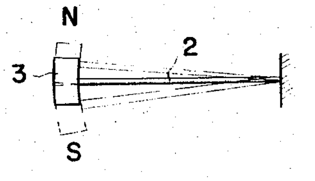
FIG. 2 is a side view of a vibrating member to explain the manner of vibration thereof.
Figure 3:
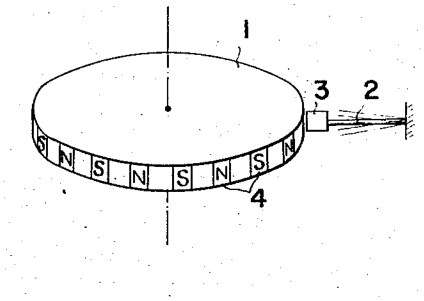
FIG. 3 is a perspective view of a modification of this invention.
Figure 4:
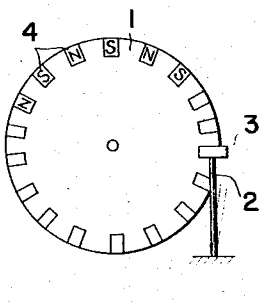
FIG. 4 is a plan view of a further modification.

The rotor 1 may be an annular ring as shown in FIG. 1 or a circular disc as shown in FIGS. 3 and 4. Where the rotor is ring shaped it is to be understood that the ring is suitably connected to a center rotating shaft, not shown, by means of supporting arms and the like, and that the rotor is supported rotatably.

The vibrating member 2 is driven similarly as an electric vibrator. For example, in the embodiment shown in FIG. 5, adjacent to the magnets 3 of a pair of vibrating members 2, there are provided a driving coil 5 and a pickup coil 6, respectively, which are connected to a suitable active element such as a transistor 7*a* or a tunnel diode 7*b*.

The operation of the circuits including elements 7*a* or 7*b*, respectively, is as follows:

The pulse current induced in pick-up coil 6 by the natural vibration of magnet 3 of the vibrator is amplified in element 7*a* or 7*b*, respectively, and this amplified pulse current is fed into driving coil 5, thereby to drive the magnet 3 adjacent to said driving coil 5, thus driving the vibrator. The coupling between the driving or pickup coil and the magnet 3 may be electrostatic or electromagnetic or a combination thereof.

FIG. 1 shows one embodiment of this invention wherein magnetic poles 4 of different polarities are disposed around the inner periphery of an annular ring shaped rotor 1, and vibrators 2 serving as the stator are fixedly secured within the ring to vibrate in a direction perpendicular to the direction of rotation of the rotor. In the modification shown in FIG. 3, magnetic poles 4 of different polarities are disposed alternately around the outer periphery of a circular disc shaped rotor 1, and the vibrating element 2 is fixed radially outside of the rotor to vibrate in a direction substantially perpendicular to the direction of rotation of the rotor. In another embodiment shown in FIG. 4, magnetic poles 4 of opposite polarities are disposed alternately on one or both sides of a circular disc shaped rotor adjacent to its outer periphery and the vibrating member 2 is disposed to vibrate substantially in the radial direction of the rotor 1. In still another modification shown in FIG. 5, the construction of the rotor 1 is the same as that in the case of FIG. 3, but the vibrating members 2 are disposed alongside the lower surface of the rotor to vibrate in a direction perpendicular to the direction of rotation of the rotor.

It should be understood that the configuration of the rotor and stator or the vibrating element may be modified variously without departing from the scope of this invention. Thus, for example, the number of the vibrating members 2 may be selected to be any suitable member, or the vibrating member 2 can be curved, as shown by dot and dash lines in FIG. 1 so as to reduce the size of the product. The direction of vibration of the vibrating member 2 should be such that the N or S pole of a magnet pole 3 secured to the free end of the vibrating member moves towards and away from the magnetic poles secured to the rotor.

The principle of this invention will now be considered by referring to FIG. 6. In FIG. 6(A), numeral $1_a$ designates a developed view of the periphery of a rotor according to the invention wherein (+) and (−) designations in the squares represent the polarities of the magnetic poles 4 of the rotor.

For the sake of brevity, it is assumed that the rotor 1 is held stationary and that the magnet 3 mounted on the vibrating member 2 moves with respect to the rotor 1, it being understood that (+) and (−) signs enclosed by circles represent the polarities of the magnet 3.

When the magnet 3 of the vibrating member 2 is at a position *a*, the positive pole of the magnet 3 interacts with the magnets on the rotor 1 in a manner such that it repels the positive pole 4 of the rotor which is located to the left as viewed in FIG. 6 and attracts the negative pole 4 to the right of the magnet 3. As a consequence, the magnet 3 moves to the right towards a position *b* while continuing its upward vibratory motion. At the position *b*, the attractive and repulsive forces of the magnets balance each other, but when the magnet 3 reaches a position *c* as a result of its rightward and upward movements, the negative pole of the magnet 3 repels the negative pole of the rotor which is now located to the left of the magnet 3 and attracts the positive pole of the rotor, so that the magnet 3 moves to the right during its downward vibratory motion toward a position *a'* through another balancing point *d*, thus completing one cycle of motion.

By repeating this cycle of operation, the magnet 3 continues its movement toward the right. Actually, however, as the magnet 3 vibrates in the vertical direction at a fixed position, it is clear that the rotor 1 rotates in the opposite direction indicated by an arrow R. In FIG. 6(B), the vibratory motion of the vibrating member 2 and, accordingly, that of the magnet 3 is represented by a sinusoidal wave S and the torque of the rotor corresponding to this motion is represented by a dotted line P.

If the frequency of vibration of the vibrating member 2 is denoted by $f_o$, and the number of pairs of magnetic poles 4 on the rotor 1 is denoted by *n*, the frequency of rotation $f_{rot}$ of the rotor 1 is represented by the following equation.

$$f_{rot}=\frac{f_o}{n}$$

As can be easily observed from this equation, this invention can provide a constant speed motor of simple construction wherein its speed can be set at any desired value by suitable selection of the natural frequency of vibration of the vibrating member and the number of magnetic poles of the rotor.

The foregoing description relates to one type of embodiment of this invention wherein each magnet 4 on the rotor has only one polarity, i.e., either N or S. In the second type of the embodiments of this invention, however, each magnet of the rotor has two poles of different polarities, i.e., N and S poles at its opposite ends.

Thus, as shown in FIG. 7 each of the magnets 4 on the perihpery of the rotor is magnetized axially so that it will have a positive pole and a negative pole, respectively, at its opposite ends. As shown in the drawing, the polarities of the magnets 4 alternate around the periphery of the rotor. More specifically, with regard to the upper peripheral edge of the rotor the polarities are (+) (−) (+) . . . , whereas with regard to the lower peripheral edge they are (−) (+) (−) . . . .

FIG. 8 represents the principle of operation of the embodiment shown in FIG. 7. In this FIG. 8, a portion of the rotor 1 is shown developed with alternate magnets 4. (+) designations enclosed in circles represent the positive pole of the magnet 3 of the vibrating member 2. Again, for the sake of simplicity, it is assumed that the rotor 1 is held stationary and that the magnet 3 moves along the periphery of the rotor while vibrating in the vertical direction.

When the magnet 3 is in a position *a*, or at the center of the axial length of one of the magnets 4, the repulsive force and the attractive force between the magnet 3 and the positive and negative poles of that particular magnet 4 will balance each other. However, when the magnet 3 reaches a position *b* owing to its rightward movement while vibrating, the positive pole of the magnet 3 and that of the magnet 4 to the left thereof repel each other, while the positive pole of the magnet 3 and the negative pole of the magnet 4 to the right thereof attract each other. Consequently, the magnet 3 arrives at a position *c* while vibrating. While in this position *c*, the attractive force and the repulsive force balance each other, and in a position *d*, the repulsive force and the attractive force act in the same direction to bring the magnet 3 to a position *a'*, thus completing one cycle of operation.

Thus, by repeating the above described cycle of operation, the rotor can be rotated continuously at a constant speed in the opposite direction. The sinusoidal motion of the magnet 3 and the torque on the rotor 1 are shown by curves $S_a$ and $P_a$, respectively, which are shown at the lower portion of FIG. 4.

The modification shown in FIG. 9 is similar to that shown in FIG. 7 except that the magnet 3 supported by the vibrating member 2 is magnetized in the circumferential direction of the rotor 1 so as to be provided with two poles of opposite polarities having the same spacing as that between adjacent magnets 4 on the rotor 1.

The operation of this motor can be clearly understood from FIG. 10 without any further description except mention of the fact that the torque acting upon the rotor is double. Thus, by increasing the member of pairs of poles of the magnet 3 by *n*, the torque can be increased by the factor *n*.

In a still further modification of this invention shown in FIG. 11 each pair of magnets 4 are inclined in opposite directions with respect to the axis of the rotor 1 so as to limit the direction of rotation of the rotor 1 to one particular direction. More explicitly, as shown by FIG. 12, the vibrating magnet 3 receives forces in the same direction, that is, toward the right, in any one of positions, *a, b, c, d* . . . .

Accordingly, the direction of rotation of the rotor 1 is always constant, and the torques at points *a* and *c* are not reduced to zero as in the foregoing embodiments, whereby the torques at various positions are averaged.

Figure 5:
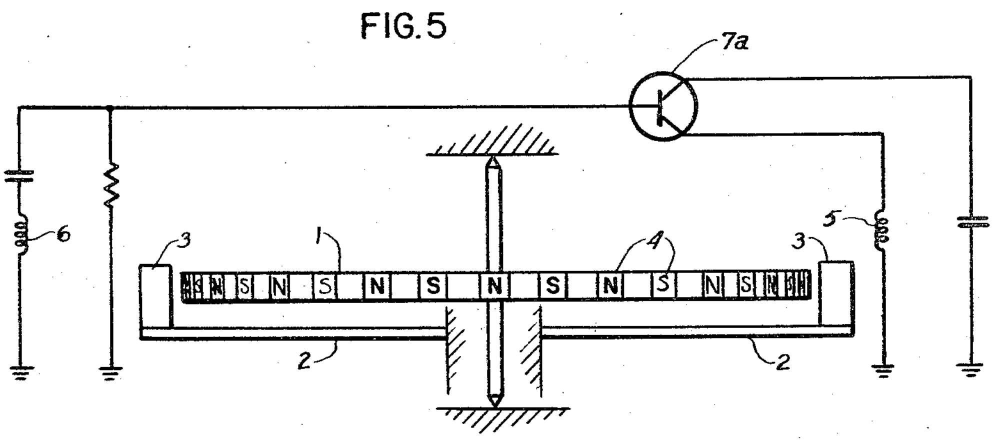
FIG. 5 is a side view of still further modifications together with electrical driving means.

Although not shown in the drawing, the vibrating member 2 of any one of the embodiments of this invention can be driven by any suitable electromagnetic or electrostatic driving means such as that shown in FIG. 5.

The present invention can be embodied as illustrated in the example of FIG. 13 by applying the construction of the example of FIG. 11 to the construction of the example of FIG. 3. In the example of FIG. 13, rotor magnets 4 are secured at equal space intervals around the periphery of the rotor 1 in such a manner that N poles and S poles are alternately disposed in the alternately opposite inclinations. The operations of the members 2, 3, 4, 5, 6, and 7 are the same as those of the above mentioned members indicated by like numerals.

In accordance wih the provisions of the patent statutes, we have explained the principle and operation of our invention and we have illustrated and described what we consider to represent the best embodiments thereof. However, we desire to have it understood that within the scope of the appended claims, the invention may be practiced otherwise than as specifically illustrated and described.

What is claimed is:

1. A constant speed motor comprising a rotor having a plurality of bar magnets secured at equal space intervals flush with and around the periphery of said rotor, alternate bar magnets being magnetized oppositely in axial direction of said rotor; a stator consisting of a vibrating member disposed radially to said rotor, a magnet mounted on the free end of said vibrating member to confront said bar magnets; and means to vibrate said magnet of said vibrating member in the axial direction of said rotor thereby to rotate said rotor at constant speed by the attractive and repulsive forces between said magnets of the rotor and the magnet of said stator; each pair of said bar magnets being inclined in opposite directions relative to the axis of said rotor.

2. A constant speed motor comprising a circular rotor including a plurality of bar magnets which are secured at equal space intervals and flush with the periphery of said rotor, disposed so that adjacent magnet poles on the periphery of the rotor are inclined at mutually opposite inclinations relative to the rotor axis, and magnetized in the radial direction of the rotor, so as to provide alternate N and S poles around said periphery; a stator consisting of a vibrating member having a magnet adjacent to and confronting the periphery of said rotor and magnetized in the axial direction of said rotor; and means for vibrating the magnet of said stator in the axial direction of said rotor; thereby to rotate said rotor at constant speed by the attractive and repulsive forces between said magnets of the rotor and the magnet of said stator.

3. The constant speed motor as defined in claim 2, wherein a pair of vibrating members is disposed below a disc shaped rotor, extending in the axial direction of said rotor and supporting bar magnets in vertical direction adjacent to the periphery of said rotor; and wherein driving means are provided including a coil associated with one of said vibrating means, a pick-up coil associated with the other vibrating member, and a transistor interconnecting said driving and pick-up coils.

References Cited

UNITED STATES PATENTS

| | | | |
|---|---|---|---|
| 2,266,037 | 12/1941 | Henninger et al. | 310—46 |
| 2,492,435 | 12/1949 | Ostline | 318—254 |
| 2,571,085 | 10/1951 | Clifford | 310—103 |
| 2,606,222 | 8/1952 | Clifford et al. | 310—21 |
| 2,690,646 | 10/1954 | Clifford | 310—103 |
| 2,913,905 | 11/1959 | Clifford | 310—103 X |
| 2,968,756 | 1/1961 | Devol | 310—156 |
| 2,994,023 | 7/1961 | Devol | 310—156 |
| 3,059,131 | 10/1962 | Everat et al. | 310—156 X |
| 3,162,798 | 12/1964 | Haydon | 318—47 X |
| 3,170,323 | 2/1965 | Kuhrt et al. | 310—156 |
| 3,171,991 | 3/1965 | Baumer | 310—21 |
| 3,253,169 | 5/1966 | Haydon et al. | 310—156 |

ORIS L. RADER, *Primary Examiner.*

G. SIMMONS, *Assistant Examiner.*